United States Patent [19]

Kruiver

[11] Patent Number: 4,633,775
[45] Date of Patent: Jan. 6, 1987

[54] ATTACHMENT CONSTRUCTION FOR THE ATTACHMENT OF A WOVEN FILTER MAT TO A PRESS PLATE OF A COCOA PRESS

[75] Inventor: Gerardus Kruiver, Westwoud/Drechterland, Netherlands

[73] Assignee: B.V. Machinefabried P.M. Duyvis, AA Koog aan de Zaan, Netherlands

[21] Appl. No.: 782,539

[22] Filed: Oct. 1, 1985

[30] Foreign Application Priority Data

Oct. 1, 1984 [NL] Netherlands .................. 8402993

[51] Int. Cl.⁴ .................. B30B 15/00; B01D 25/12
[52] U.S. Cl. .................. 100/297; 99/495; 210/231; 210/439
[58] Field of Search .................. 99/495, 510; 100/295, 100/297, 298, 112, 211; 210/231, 230, 490, 439, 486

[56] References Cited

U.S. PATENT DOCUMENTS 1,767,078 6/1930 Johnson .................. 100/297 X
2,715,965 8/1955 Carver .................. 210/231

Primary Examiner—Timothy F. Simone
Attorney, Agent, or Firm—Dennison, Meserole, Pollack & Scheiner

[57] ABSTRACT

The invention relates to the attachment of a filter mat (10), woven from stainless steel wire, to a press plate (8) of a cocoa press. It is known to insert the bent-over edge part of the mat (10) into a groove (15) in the press plate (8) and fix it by means of a pressed-in cord (19). In order to avoid the mat being broken at the place of bending, it is proposed according to the invention that the opposite walls (16, 17) of the groove against which the peripheral edge of the filter mat (10) and the cord (19) are pressed should form an angle between 25° and 55° with the surface of the press plate.

6 Claims, 4 Drawing Figures

ATTACHMENT CONSTRUCTION FOR THE ATTACHMENT OF A WOVEN FILTER MAT TO A PRESS PLATE OF A COCOA PRESS

BACKGROUND OF THE INVENTION

The invention relates to an attachment construction for the attachment of a woven filter mat to a press plate of a cocoa press, said filter mat being bent over at its peripheral edge, and the bent-over edge part being inserted into a groove in the press plate and fixed by means of a pressed-in cord.

A cocoa press comprises a series of pots and pressers which are supported on pull rods between a cylinder block and an end block, and which alternate. The pots are rings which can slide over part of a presser. Springs extend between the pots and a radially projecting flange part of the pressers. Fastened on either side of each presser are press plates, each of which is provided with a large number of bores running transversely to the surface thereof and debouching at the back of the plate in a system of round and radial grooves. This system is connected to discharge pipes for pressed-out cocoa butter. Each press plate is also covered with a filter mat which is woven from stainless steel wire. Disposed between two filter mats fitted opposite each other there is always a press chamber into which cocoa mass can be conveyed through infeed pipes. Through the sliding of the pots and pressers into each other, this mass fed into the press chambers is brought to high pressure, as a result of which the cocoa butter is pressed through the filter mat and via the said bores and the said system of grooves into the discharge pipes. Left behind between the filter mats of a press chamber is a filter cake of cocoa particles which has to be removed after each pressing. Here the filter cake is detached from the filter mat by a pot, with very great forces being exerted on the mat. Relatively thick mats (thickness from 1 mm to 1.5 mm) are often preferred because of their great strength. However, the attachment of such a thick mat to a press plate is expensive. One known method is to screw the finished edge of the mat by means of a specially shaped attachment edge to the peripheral edge of the press plate, in which process the edge of the mat is slightly bent. Another attachment method is to insert the peripheral edge of a relatively thick mat with little flexibility into a groove in a steel ring which is fastened to the press plate.

SUMMARY OF THE INVENTION

Relatively thin filter mats (thickness from 0.6 to 0.9 m) are very flexible. A known method is to bend the peripheral edge of a thin mat over 90°, to insert it into a groove in the press plate and to fix it with a cord made of teflon, aluminium or the like. It has been found that the mat soon breaks at the point where it is bent over, in particular at the point where the "warp" wires of the mat weave project vertically and the "weft" wires can easily slide off them. During detachment from the press plate very great forces are exerted on the mat. In general, a thick mat is preferable at regards strength, but the above-described finishing of the edge makes this mat too expensive.

The object of the invention is to avoid the above-mentioned disadvantages of attachment constructions of thin and thick mats and to produce a new attachment construction which leads in the case of thick mats to considerable saving and in the case of thin mats to a considerable improvement of durability and lengthening of the service life.

According to the invention, the attachment construction mentioned in the preamble is to this end characterised in that the opposite walls of the groove, against which the peripheral edge of the filter mat or the cord are pressed, form an angle between 25° and 55° with the surface of the press plate.

Since the peripheral edge of the mat is only bent over a small angle, this fastening method is possible in the case of thick mats with little flexibility, and one can dispense with an expensive finishing of the peripheral edge. In the case of a thin mat, the bending over only a small angle means that the bent-over part is much less fragile.

It is preferable for the first part of the groove wall against which the peripheral edge of the filter mat is pressed to form an angle of about 30° and the remaining part of this groove wall to form an angle of about 45° with the surface of the press plate, and for the groove wall against which the cord is pressed to form an angle of about 45° with the surface of the press plate.

BRIEF DESCRIPTION OF THE DRAWINGS

The invention will now be explained in greater detail with reference to the figures, in which an embodiment is illustrated.

DESCRIPTION OF THE PREFERRED EMBODIMENTS

Figure 1:
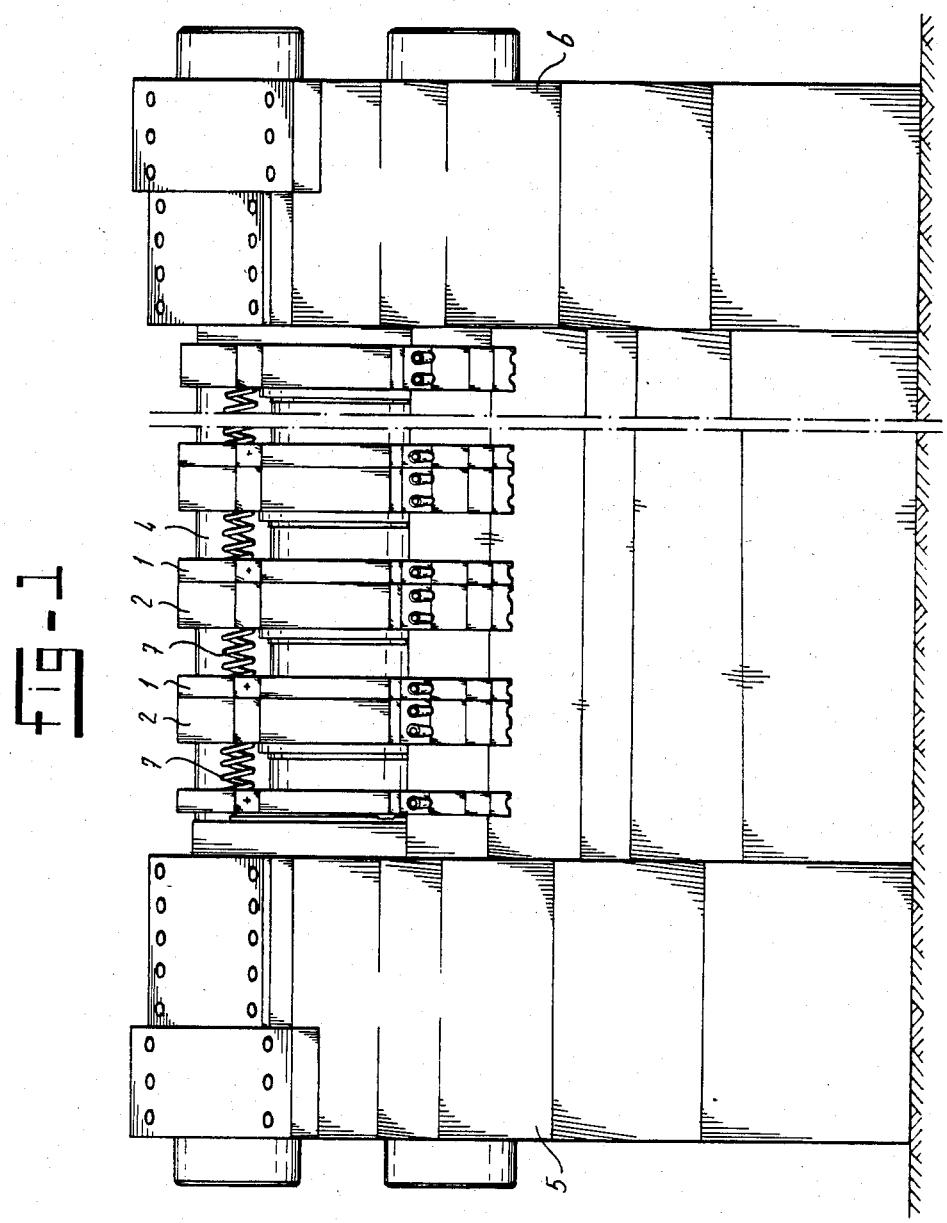
FIG. 1 shows a side view of a cocoa press.
Figure 2:
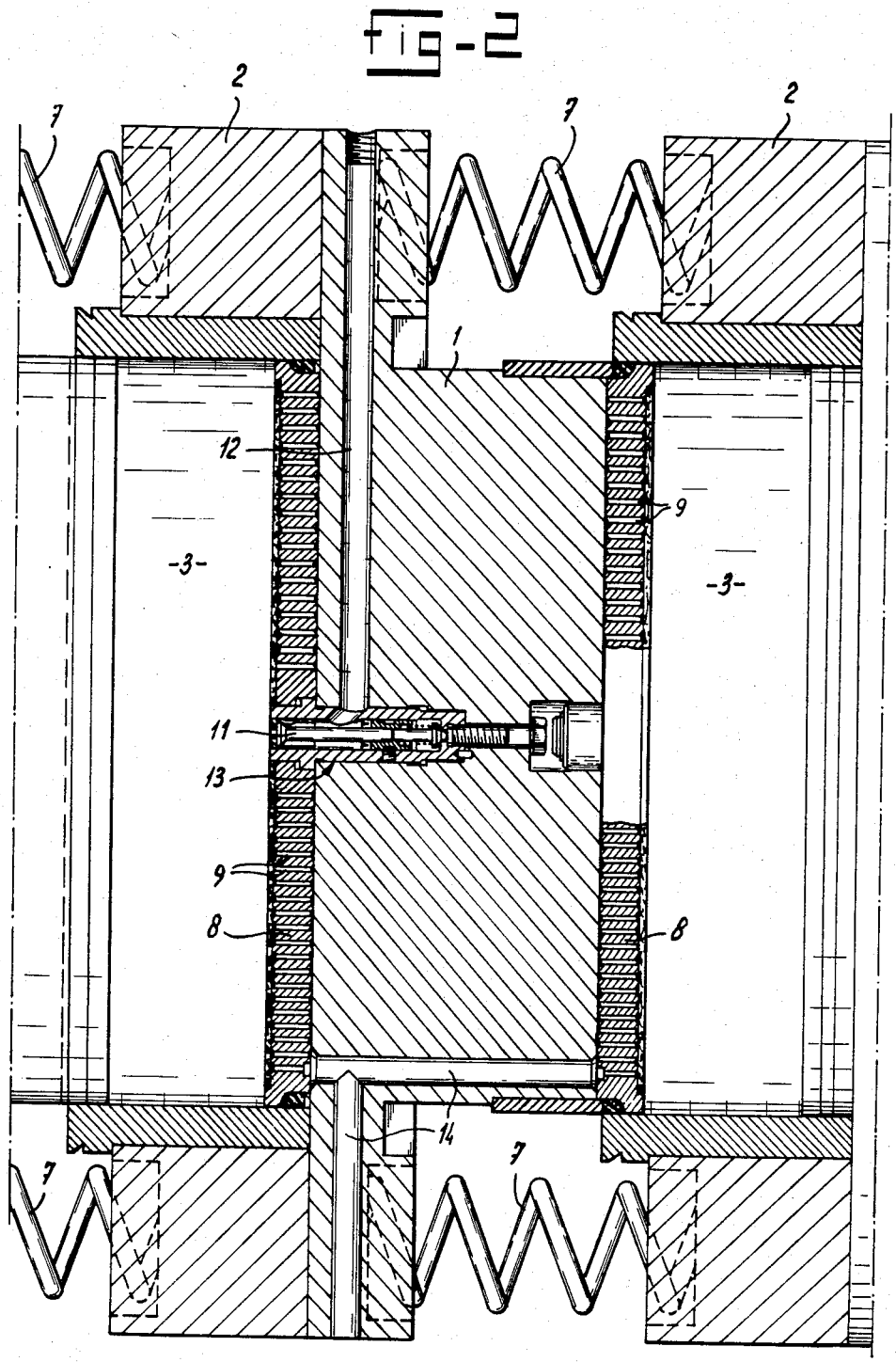
FIG. 2 shows a longitudinal section through part of the cocoa press according to FIG. 1, on a larger scale.

The cocoa press shown in FIGS. 1 and 2 comprises a series of pressers 1 and pots 2 which are placed alternately one after the other, and between which are disposed press chambers 3. These pressers and pots are supported in sliding fashion on pull rods 4, which extend between a cylinder block 5 and an end block 6. Located in the cylinder block is a hydraulic plunger which can exert great pressure on the pressers and pots, in which case the pressers slide into the pots. Provided between the pots and pressers are compression springs 7 which push the pots and pressers apart when the plungers return to the initial position. Each of the pressers is provided on either side with a press plate 8 in the form of a steel disc provided with bores 9, on which disc a filter mat 10 (FIG. 4) is attached.

Recessed in each presser is a feed pipe for the cocoa mass to be pressed out. It consists of an axial part 11 disposed in the heart of the presser and a radial part 12. Disposed in the axial part 11 of each feed pipe is a shut-off mechanism 13 which can be opened by the pressure of the cocoa mass to be fed in, and the construction of which is described in Netherlands Patent Application 82.00588, which has been laid open for inspection. The bores 9 debouch in a system of round and radial grooves, which is connected with discharge pipes 14 for pressed-out cocoa butter. The cocoa mass is placed under pressure in the press chambers 3 through the pots and pressers sliding into each other. Remaining behind on the filter mats 10 is a filter cake (not shown) which during the return of the pressers to the initial position remains attached to the presser against a radial flange of which a pot is pressed. By means of separate hydraulic cylinders (not shown) the pots are shifted in the direction of the pressers lying opposite them, in which process the filter cakes are carried to the opposite pressers which detach the cakes from the pots, so that they can fall out of the press.

The present invention concerns the attachment method of the filter mat 10, woven from stainless steel wire, to a press plate 8. Provided in a reference surface (23) of the press plate for this purpose near the periphery is a groove 15 (FIG. 3), whose opposite walls 16, 17 form an angle between 25° and 55° with the surface of the press plates.

In the embodiment illustrated, the wall 16 first defines an entrance section 24 which passes over an angle $\alpha$ of about 30° and then under an angle $\beta$ of about 45°. The wall 17 runs over the entire length under an angle $\gamma$ of about 45°.

Figure 4:
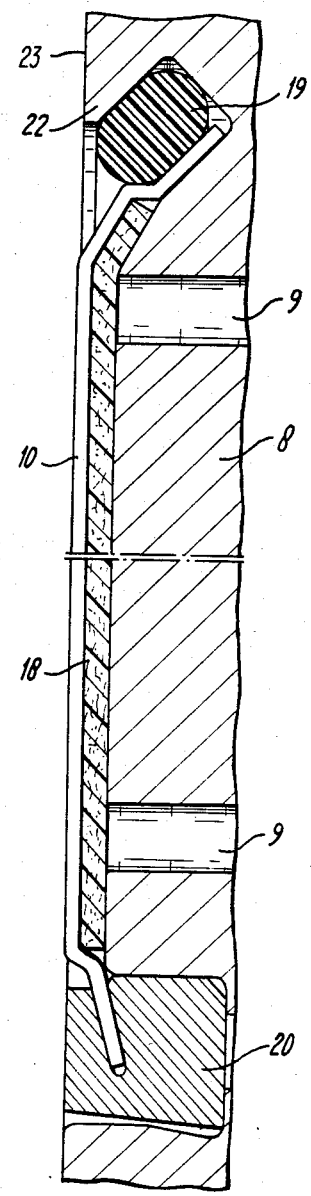
FIG. 4 shows the part of the press plate shown in FIG. 3, with the filter mat attached to it.

The woven filter mat 10 is seen in FIG. 4 as bent over at the periphery and inserted into the groove described. Under the filter mat is a so-called under-mat 18, whose peripheral edge is bent over the angle $\alpha$ and only extends over the length of the part of the wall 16 running under the angle $\beta$. The peripheral part of the filter mat inserted into the groove is fixed by a cord 19 made of teflon, aluminium or another suitable material and pressed into the groove.

Figure 3:
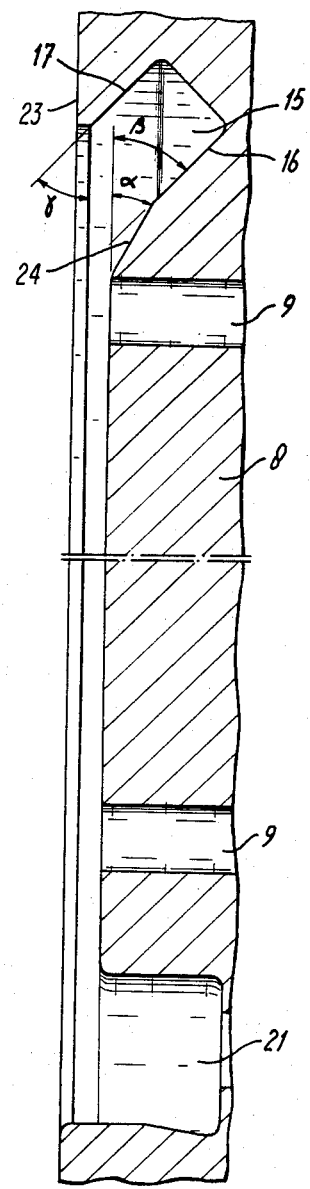
FIG. 3 shows a cross section of part of a press plate of the press according to FIGS. 1 and 2.

One of the two filter mats 10 attached on either side of a press plate must be attached around the outlet of the axial pipe part 11. In FIGS. 3 and 4 the edge of the mat is inserted into a stainless steel ring 20 which is fitted and fastened in a groove 21 in the press plate. This method of attachment is relatively cheap because the diameter of the ring 20 is only small; use of this attachment method for the fastening of the peripheral edge of the mats 10 leads to high costs, as mentioned above. It is not out of the question that for the attachment of the edge of the filter mats extending round the outlet of the axial pipe part 11 one could use the method according to the invention, i.e. the attachment method used for the peripheral edge of the filter mats.

The attachment method shown for the peripheral edge of the filter mat 10 has the following advantages:

in the case of very flexible, relatively thin mats the bend over a relatively small angle (30° or 45°) means that the mats break considerably less quickly at the bending lines;

in the case of relatively thick mats with little flexibility the peripheral edge can be fastened securely without expensive attachment sections; the bend over a relatively small angle is possible.

In the embodiment according to FIGS. 3 and 4 a value of 30° was not chosen for the angles $\beta$ and $\gamma$, since in that case the wall part 22 near the free end of the boundary wall 17 would be too fragile. By preceding the wall part 16 running under 45° by a wall part running under 30°, the bend of the peripheral edge takes place gradually, during which the under mat 18 with its peripheral edge is bent only slightly and the peripheral edge of the mat 10 is very securely retained.

Various modifications are conceivable within the scope of the invention.

I claim:

1. In apparatus for the attachment of a woven filter mat to a press plate of a cocoa press comprising a filter mat (10) forming a peripherial edge, a press plate (8) defining a reference surface (23) and a groove (15) arranged extending into the plate from the reference surface (23) for receiving the peripheral edge of the mat (10), the peripheral edge of the mat being bent-over for insertion into the groove (15) and a cord (19) pressed into the groove for retaining in place the peripheral edge of the mat, the improvement wherein the groove (15) is partially defined by a pair of opposed, substantially parallel walls (16, 17) against which walls the peripheral edge of the mat (10) and the cord (19) are pressed and which walls (16, 17) form an angle ($\beta$, $\gamma$) in a range of 25° and 55° with respect to the reference surface (23) of the press plate (8).

2. An improvement as defined in claim 1, wherein the groove (15) formed in the press plate (8) is defined further by an entrance section (24) of a one (16) of the pair of opposed walls against which the peripheral edge of the mat (10) is pressed being disposed at an angle ($\alpha$) with respect to the reference surface (23) of the press plate (8) which is less than the angle ($\beta$, $\gamma$) of the opposed wall (16, 17) with respect to the reference surface (23) of the press plate (8).

3. An improvement as defined in claim 2, wherein the angle ($\beta$, $\gamma$) of the pair of opposed walls with respect to reference surface (23) of the press plate is about 45°.

4. An improvement as defined in claim 2, wherein the angle ($\alpha$) of the entrance section of a one (16) of the pair opposed walls is about 30°.

5. An improvement as defined in claim 4, wherein the angle ($\beta$, $\gamma$) of the pair of opposed walls with respect to reference surface (23) of the press plate is about 45°.

6. An improvement as defined in claim 1, wherein the angle ($\beta$, $\gamma$) of the pair of opposed walls with respect to reference surface (23) of the press plate is about 45°.

* * * * *